United States Patent
Taguchi (10) Patent No.: US 10,207,607 B2
(45) Date of Patent: Feb. 19, 2019

(54) VEHICLE SEAT

(71) Applicant: TACHI-S CO., LTD., Akishima-shi, Tokyo (JP)

(72) Inventor: Masayuki Taguchi, Tokyo (JP)

(73) Assignee: TACHI-S CO., LTD., Akishima-shi (JP)

( * ) Notice: Subject to any disclaimer, the term of this patent is extended or adjusted under 35 U.S.C. 154(b) by 0 days.

(21) Appl. No.: 15/788,056

(22) Filed: Oct. 19, 2017

(65) Prior Publication Data
US 2018/0111529 A1    Apr. 26, 2018

(30) Foreign Application Priority Data

Oct. 26, 2016 (JP) .................................. 2016-209385

(51) Int. Cl.
*B60N 2/58* (2006.01)
*B60N 2/64* (2006.01)
*B60N 2/68* (2006.01)

(52) U.S. Cl.
CPC ............. *B60N 2/5816* (2013.01); *B60N 2/64* (2013.01); *B60N 2/68* (2013.01)

(58) Field of Classification Search
CPC ........... B60N 2/5816; B60N 2/64; B60N 2/68
USPC ..... 297/183.6, 183.7, 188.04, 452.18, 218.1, 297/218.2, 218.3, 218.5
See application file for complete search history.

(56) References Cited

U.S. PATENT DOCUMENTS

| | | | | |
|---|---|---|---|---|
| 3,485,527 A * | 12/1969 | Barghout | ............... | A47C 4/021 297/183.7 |
| 5,915,329 A * | 6/1999 | Watkins | ................ | B63B 35/731 297/183.7 X |
| 5,964,506 A * | 10/1999 | Coates | ................. | A47D 15/006 297/183.7 X |
| 7,066,552 B2 * | 6/2006 | Yoshida | ................... | B60N 2/64 297/452.18 |
| 7,452,035 B2 * | 11/2008 | Astle | ...................... | A47C 5/043 297/183.7 |
| 7,998,551 B2 * | 8/2011 | Gasser | ................. | A47B 95/043 297/183.7 |
| 8,376,456 B2 * | 2/2013 | Fujita | ........................ | B32B 7/12 297/452.18 X |
| 8,550,563 B2 * | 10/2013 | Nasshan | .................. | B60N 2/22 297/452.18 |
| 9,649,964 B2 * | 5/2017 | Imajo | ....................... | B60N 2/68 |

(Continued)

FOREIGN PATENT DOCUMENTS

WO    2014/003143 A1    1/2014

*Primary Examiner* — Rodney B White
(74) *Attorney, Agent, or Firm* — Westerman, Hattori, Daniels & Adrian, LLP (57) ABSTRACT

A vehicle seat that ensures improving appearance. A vehicle seat includes a first cover member to which a terminal of a first skin is stitched and a second cover member to which a terminal of a second skin is stitched. The first cover member and the second cover member are joined together. This ensures reducing a displacement of the first skin and the second skin relative to the first cover member and the second cover member. This ensures reducing the first skin and the second skin being turned up at an outer edge of a flange portion of the first cover member and an end portion of the second cover member on the second skin side. This ensures improving appearance of the vehicle seat.

13 Claims, 6 Drawing Sheets

(56) References Cited

U.S. PATENT DOCUMENTS

| | | | | |
|---|---|---|---|---|
| 2003/0020319 A1* | 1/2003 | Adams | ............. | A47C 5/12 |
| | | | | 297/452.18 |
| 2008/0157570 A1* | 7/2008 | Williams | ............. | A47C 7/00 |
| | | | | 297/183.7 |
| 2010/0109415 A1* | 5/2010 | Roszczenko | ............. | B60N 2/22 |
| | | | | 297/452.18 |
| 2011/0057498 A1* | 3/2011 | Fujita | ............. | B60N 2/0705 |
| | | | | 297/452.18 |
| 2018/0281645 A1* | 10/2018 | Tokumoto | ............. | B60N 2/686 |

* cited by examiner

VEHICLE SEAT

TECHNICAL FIELD

The present invention relates to a vehicle seat and especially relates to a vehicle seat that can improve appearance.

BACKGROUND ART

There has been known the following technique. A through-hole is formed on a cushion member disposed at a seat back of a vehicle seat. A cover member made of a resin material covers an inner peripheral surface of the through-hole. For example, Patent Literature 1 discloses a vehicle seat that includes a functional element 1 (a cover member) including a tubular body 10 and a flange 11. The functional element 1 is engaged with a through-hole 30 formed at a pad 3 (a cushion member).

However, the above-described conventional technique covers an opening of the through-hole 30 at a rear side of a seat back SB by a skin material 6 (a skin). Accordingly, the through-hole 30 cannot communicate between a front side and the rear side of the seat back SB.

CITATION LIST

Patent Literature

[Patent Literature 1] WO2014/003143 (for example, paragraph 0028, FIG. 2)

SUMMARY OF THE INVENTION

Technical Problem

In contrast to this, the applicant of this application has hit upon the following. While a terminal of a skin coating a surface on a front side of a cushion member is temporarily attached to a terminal of a skin coating a surface on a rear side of the cushion member at an inside of a through-hole, a pair of cover members are mutually joined at the inside of the through-hole (not publicly-known at the time of application of this application). Since this fixes the mutual temporarily attached parts of the skins with the temporarily attached parts sandwiched between an inner peripheral surface (the cushion member) of the through-hole and the pair of cover members, the through-hole can communicate between the front side and the rear side of the seat back.

Although this configuration presses the terminals of the skins into the through-hole by the pair of cover members, for example, an application of a load from a seated person in a direction of pulling the skins from the through-hole possibly displaces the terminals of the skins relative to (to the front side or the rear side of the seat back) the pair of cover members. This causes a problem that the skins are turned up at end portions of the cover members on the opening side of the through-hole, resulting in deterioration of appearance of the vehicle seat.

The present invention has been made to address the above-described problem and the object is to provide a vehicle seat that can improve appearance.

Solution to Problem and Advantageous Effects of Invention

According to the vehicle seat according to a first aspect, the cover member is constituted of a first cover member and a second cover member. A first skin has a terminal coupled to the first cover member. A second skin has a terminal coupled to the second cover member. The first cover member and the second cover member are joined together. This ensures reducing a displacement of the first skin and the second skin relative to the first cover member and the second cover member. This ensures reducing the first skin and the second skin being turned up at end portions of the cover member, thereby bringing an effect of improving appearance of the vehicle seat.

According to the vehicle seat according to a second aspect, in addition to the effect brought by the vehicle seat according to the first aspect, the following effect is provided. Any one of the first cover member or the second cover member has a through-hole or a fitted portion formed as a depressed portion. The other one has a convex portion formed fittable to the fitted portion. The fitted portion and the convex portion are fitted to join the first cover member and the second cover member together. Accordingly, by fitting the fitted portion to the convex portion, the joined position of the first cover member and the second cover member can be positioned. This ensures reliable joining of the first cover member and the second cover member at the desired joined position, thereby ensuring reducing relaxation of a tensile force of the first skin and the second skin. Since this ensures reducing a crease in the first skin and the second skin, bringing the effect of improving the appearance of the vehicle seat.

According to the vehicle seat according to a third aspect, in addition to the effect brought by the vehicle seat according to the second aspect, the convex portion is formed projecting to the cushion member side. The convex portion is fitted to the fitted portion to the cushion member side. Therefore, the convex portion does not project to a surface opposite to the cushion member in the first cover member or the second cover member. This brings the effect of improving the appearance of the vehicle seat.

According to the vehicle seat according to a fourth aspect, in addition to the effect brought by the vehicle seat according to the third aspect, the first cover member includes a flange portion coating an edge of an opening of the through-hole. The first cover member is made of a resin material with predetermined flexibility. Accordingly, even if the flange portion contacts a seated person, uncomfortable feeling felt by the seated person can be reduced. This ensures improving a seating comfort of the vehicle seat.

In this case, the second cover member is made of a resin material with a hardness higher than the first cover member. This reduces a deformation of the second cover member due to an external force, ensuring reducing an exit of the convex portion from the fitted portion. That is, even when the first cover member is made of the flexible resin material, the fitting of the fitted portion to the convex portion can be less likely to be disengaged. This brings an effect that the first cover member and the second cover member can be strongly joined together while the seating comfort of the vehicle seat is improved.

According to the vehicle seat according to a fifth aspect, in addition to the effect brought by the vehicle seat according to the fourth aspect, the convex portion is formed at the second cover member whose hardness is higher than the first cover member, ensuring reducing the deformation of that convex portion. That is, for example, in the case where the external force is applied in a direction that the first cover member and the second cover member separate from one another, bending of the convex portion due to the external force can be reduced. This brings an effect that the first cover member and the second cover member can be further strongly joined together.

According to the vehicle seat according to a sixth aspect, in addition to the effect brought by the vehicle seat according to the second aspect, any one of the first cover member or the second cover member includes a plurality of the fitted portions. The other one includes a plurality of the convex portions. This brings the effect that the first cover member and the second cover member can be strongly joined together.

According to the vehicle seat according to a seventh aspect, in addition to the effect brought by the vehicle seat according to the first aspect, the seat back includes a frame and a joining member. The frame forms a framework of the seat back. The joining member is fixed to the frame and formed along the inner peripheral surface of the through-hole. Any one of the first cover member or the second cover member is joined directly to the joining member. The other one of the first cover member or the second cover member is joined to the joining member via any one of the first cover member or the second cover member or joined directly to the joining member. Accordingly, the joining member restricts the displacement of the first cover member and the second cover member relative to the frame.

That is, for example, compared with the case where the first cover member and the second cover member are mutually directly joined together, the displacement of the entire first skin, first cover member, second cover member, and second skin relative to the frame can be reduced. Since the relaxation of the tensile force of the first skin and the second skin can be reduced, thereby ensuring reducing the crease of the first skin and the second skin. This brings the effect of ensuring improving the appearance of the vehicle seat.

According to the vehicle seat according to an eighth aspect, in addition to the effect brought by the vehicle seat according to the seventh aspect, the first cover member and the second cover member are both joined directly to the joining member; therefore, the respective joinings of the first cover member and the second cover member to the joining member can be individually performed. Accordingly, for example, compared with the case where a worker holds both the first cover member and the second cover member and the first cover member and the second cover member are coupled to one another, this brings an effect of improving working efficiency when the vehicle seat is manufactured.

According to the vehicle seat according to a ninth aspect, in addition to the effect brought by the vehicle seat according to the eighth aspect, the first cover member and the second cover member are formed into an identical shape. Therefore, the first cover member and the second cover member can be formed from an identical mold. This brings an effect of ensuring reducing a production cost of the vehicle seat.

According to the vehicle seat according to a tenth aspect, in addition to the effect brought by the vehicle seat according to the first aspect, the following effect is provided. The second cover member is disposed inside the through-hole. The second skin includes a first covering portion and a second covering portion. The first covering portion coats the surface on the rear side of the cushion member. The second covering portion is stitched to the first covering portion. The second covering portion coats the inner peripheral surface of the through-hole. The first covering portion and the second covering portion have a stitched position at a position along an edge of an opening of the through-hole. Accordingly, the stitched parts of the first covering portion and the second covering portion are easily bent along the edge of the opening of the through-hole. Since this ensures reducing the crease of the second skin near the edge of the opening of the through-hole, this brings the effect of improving the appearance of the vehicle seat.

According to the vehicle seat according to an eleventh aspect, in addition to the effect brought by the vehicle seat according to the first aspect, the through-hole has an opening whose edge is coated by the first cover member and the second cover member. Accordingly, the terminals of the first skin and the second skin can be positioned at the respective front side and rear side of the seat back. This ensures avoiding the first skin and the second skin to bend near the edge of the opening of the through-hole; therefore, the crease of the first skin and the second skin can be reduced. This brings the effect of improving the appearance of the vehicle seat.

According to the vehicle seat according to a twelfth aspect, in addition to the effect brought by the vehicle seat according to the first aspect, the first cover member is joined to an inner peripheral side of the second cover member. This is less likely to visually perceive a level difference generated at the inner peripheral surface of the second cover member by the thickness of the second cover member from the front side of the seat back. This brings the effect of improving the appearance of the vehicle seat.

According to the vehicle seat according to a thirteenth aspect, in addition to the effect brought by the vehicle seat according to the twelfth aspect, the second skin is coupled to the inner peripheral side of the second cover member. This is less likely to visually perceive the level difference generated at the inner peripheral surface of the second cover member by the thickness of the second cover member. This brings the effect of improving the appearance of the vehicle seat.

DESCRIPTION OF EMBODIMENTS

Figure 1A:
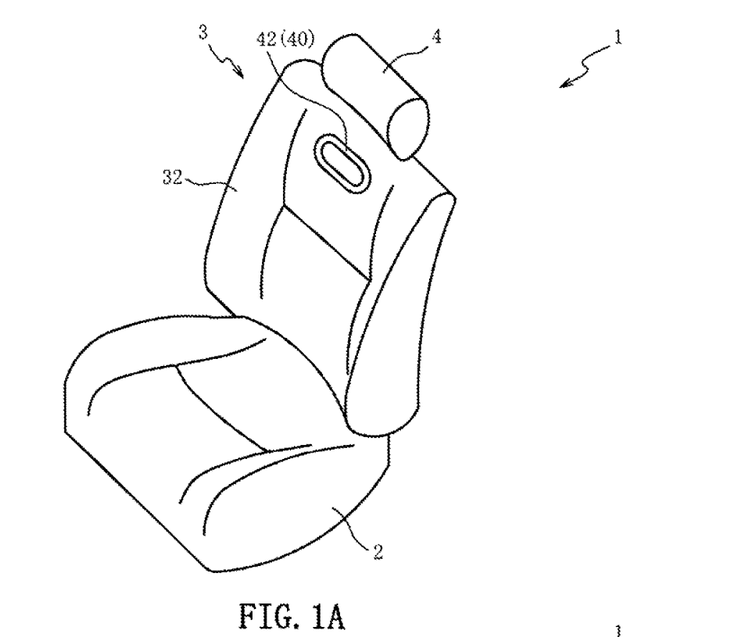
FIG. 1A is a perspective view of a vehicle seat of a first embodiment of the present invention.
Figure 1B:
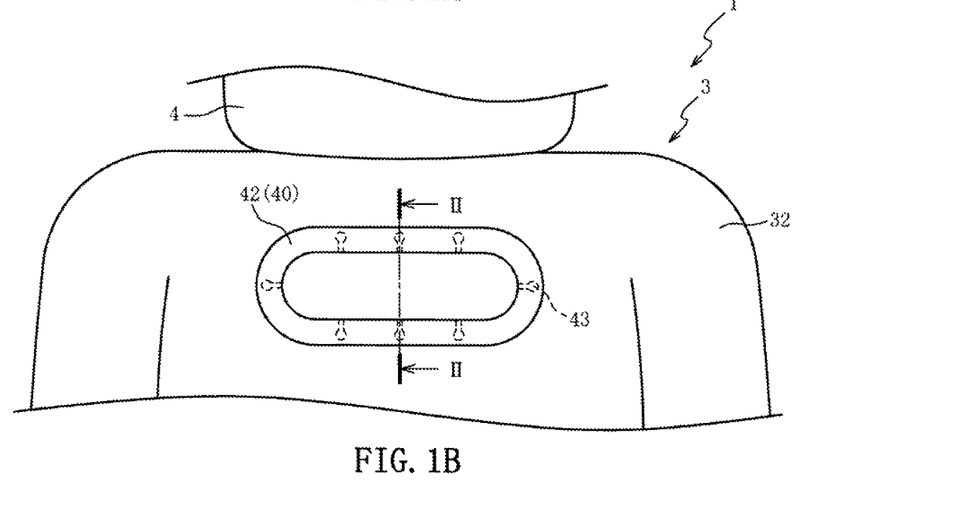
FIG. 1B is a front view of the vehicle seat.

The following describes preferred embodiments according to the present invention with reference to the attached drawings. First, the following describes an overall configuration of a vehicle seat 1 with reference to FIG. 1. FIG. 1A is a perspective view of the vehicle seat 1 of a first embodiment of the present invention, and FIG. 1B is a front view of the vehicle seat 1. FIG. 1B illustrates the partially omitted vehicle seat 1.

As illustrated in FIG. 1, the vehicle seat 1 is a seat mounted to a vehicle (for example, an automobile and a railway vehicle). The vehicle seat 1 includes a seat cushion 2, which forms a seat surface, the seat back 3, which is coupled to a rear end of the seat cushion 2 to form a backrest, and a head rest 4, which is disposed at an upper end of the seat back 3.

A through-hole 34 (see FIG. 2) is formed on an upper end side of a seat back 3. A first cover member 40 and a second cover-member 50 (see FIG. 2 for the second cover member 50) are engaged with this through-hole 34. These first cover member 40 and second cover member 50 are members to coat the inner peripheral surface of the through-hole 34 and fix terminals of a first skin 32 and a second skin 33 (see FIG. 2 for the second skin 33).

Figure 2:
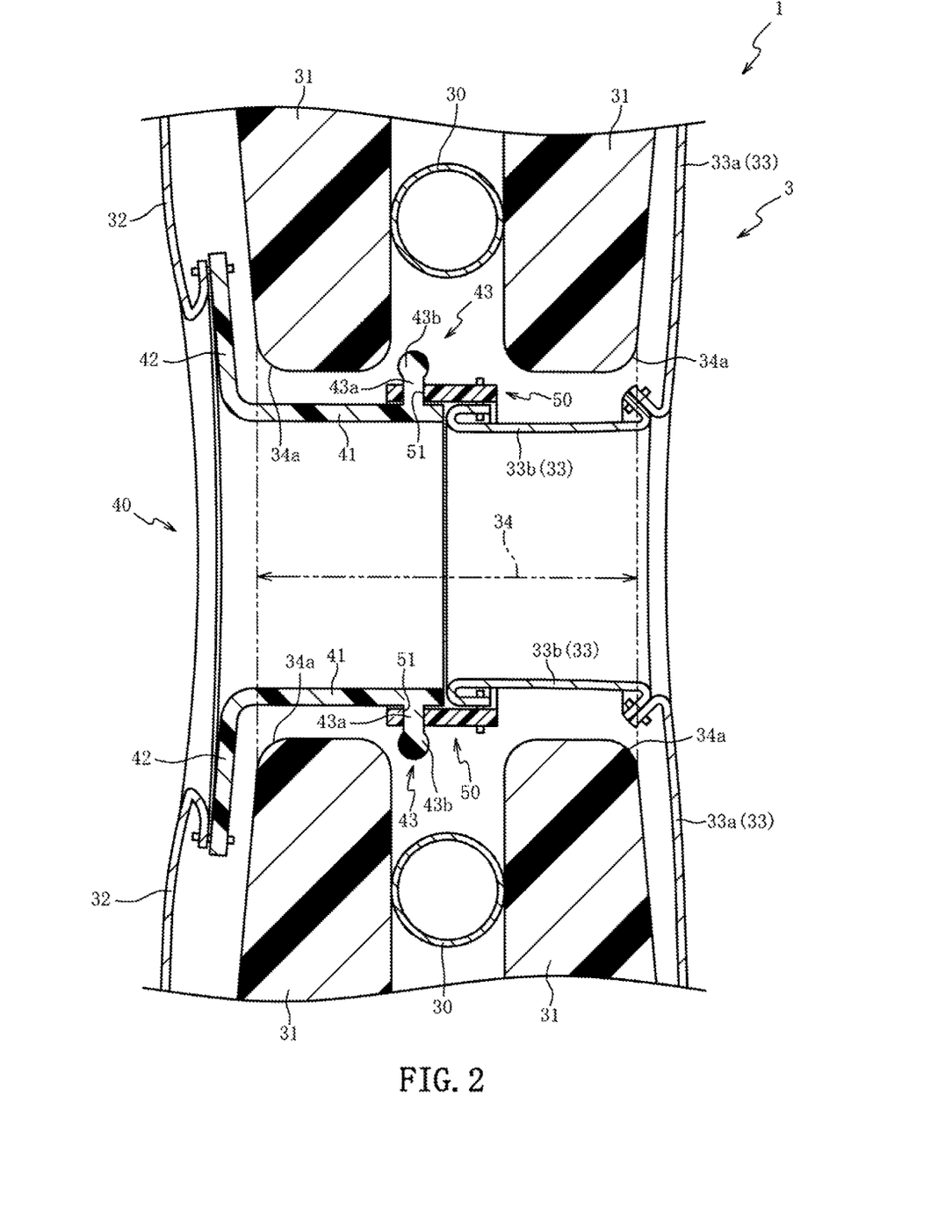
FIG. 2 is a partially enlarged cross-sectional view taken along a line II-II in FIG. 1B.

The following describes a detailed configuration of the seat back 3 with reference to FIG. 2. FIG. 2 is a partially enlarged cross-sectional view of the vehicle seat 1 taken along a line II-II in FIG. 1B. For ease of understanding, FIG. 2 schematically illustrates the cross-sectional surface of the vehicle seat 1 (the same applies to FIG. 3 to FIG. 6 described later).

As illustrated in FIG. 2, the seat back 3 includes a frame 30, a cushion member 31, the first skin 32, the second skin 33, the through-hole 34, the first cover member 40, and the second cover member 50. The frame 30, which is made of a metallic material, forms a framework of the seat back 3. The cushion member 31 is supported by the frame 30. The first skin 32 coats the surface on the front side (the left side in FIG. 2) of the cushion member 31. The second skin 33 coats the surface on the rear side (the right side in FIG. 2) of the cushion member 31. The through-hole 34 is formed to pass through the cushion member 31 along a front-rear direction (a right-left direction in FIG. 2) of the seat back 3. The first cover member 40 and the second cover member 50 coat the inner peripheral surface of the through-hole 34.

The cushion member 31 is made of an elastic foamed resin (for example, a flexible polyurethane foam). The first skin 32 and the second skin 33 are made of, for example, a fabric, a synthetic leather, or a leather.

The through-hole 34 is formed into a horizontally long oval shape in front view of the seat back 3 and communicates between the front side and the rear side of the seat back 3. The first skin 32 and the second skin 33 have openings. The terminals (the end portions) of the openings are folded back to the cushion member 31 side and are stitched to the respective first cover member 40 and second cover member 50.

The second skin 33 includes a first covering portion 33a, which coats the surface on the rear side of the cushion member 31, and a tubular second covering portion 33b, which is coupled to the first covering portion 33a and coats the inner peripheral surface of the through-hole 34.

The respective end portions of the first covering portion 33a and the second covering portion 33b are folded back to the cushion member 31 side and stitched. The stitched position of the first covering portion 33a and the second covering portion 33b is positioned along an edge 34a of the opening of the through-hole 34 on the second skin 33 side. Accordingly, the stitched part of the first covering portion 33a and the second covering portion 33b is easily bent along the edge 34a of the opening of the through-holes 34. Since this ensures reducing a crease of the second skin 33 near the edge 34a of the opening of the through-hole 34, appearance of the vehicle seat 1 is improved.

The first cover member 40 includes a tubular pipe portion 41, which is formed along the inner peripheral surface of the through-hole 34, a flange portion 42, which projects out from the end portion on the first skin 32 side of the pipe portion 41 outside in a flange shape, and a plurality of convex portions 43, which are formed vertically (to the cushion member 31 side) projecting from the outer peripheral surfaces of the pipe portions 41 on the cushion member 31 side. The first cover member 40 is made of an elastomer resin with predetermined flexibility (for example, an olefin-based elastomer resin with Shore A hardness of 50).

The pipe portion 41 is disposed to extend from the edge 34a of the opening of the through-hole 34 on the first skin 32 side to the proximity of the approximately center of the through-hole 34 (the center in the extension direction (the right-left direction in FIG. 2) of the through-hole 33). The flange portion 42 is formed into the flange shape projecting out with a shape approximately similar to the opening of the through-hole 34 in the front view of the seat back 3. The terminal of the first skin 32 is stitched to the distal end side of the flange portion 42 in the projecting direction. This flange portion 42 coats the edge 34a of the opening of the through-hole 34 on the first skin 32 side. Compared with the case where the edge 34a of the opening of the through-hole 34 is coated by the first skin 32, this improves the appearance of the vehicle seat 1.

In this case, since the first cover member 40 is made of the resin material with the predetermined flexibility, this ensures reducing uncomfortable feeling felt by the seated person even if the seated person contacts the flange portion 42. Accordingly, a seating comfort of the vehicle seat 1 can foe improved while the appearance of the vehicle seat 1 is improved.

The convex portion 43 includes an upright portion 43a, which is arranged upright from the outer peripheral surface of the pipe portion 41, and a sphere-shaped fitted portion 43b, which is formed at the distal end portion of the upright portion 43a arranged upright. The convex portions 43 are disposed at the end portions of the pipe portions 41 on the second skin 33 side (the right side in FIG. 2). Three pieces of the convex portions 43 are disposed on the respective outer peripheral surfaces on both sides of the pipe portions in the upper-lower direction (the upper-lower direction in FIG. 2). One piece (eight pieces in total) of the convex portion 43 is disposed (see FIG. 1B) on the respective outer peripheral surface on both sides of the pipe portions 41 in the right-left direction (the direction vertical to the paper of FIG. 2). The plurality of respective convex portions 43 are disposed along the circumstantial direction of the pipe portions 41 and the second cover members 50 are fitted to the convex portions 43.

The second cover member 50 is formed into a tubular shape along the inner peripheral surface of the through-hole 34. The inner periphery of the second cover member 50 is formed slightly larger than the outer periphery of the pipe portion 41 of the first cover member 40. The entire second cover member 50 is disposed inside the through-hole 34. The second covering portion 33b is stitched to the inner peripheral surface of the rear end part of the second cover member 50. The second cover member 50 includes a fitted portion 51 formed on the front end part and is made of a resin (for example, a polypropylene and an ABS resin with Rockwell R hardness of 80 to 100) harder than the first cover member 40.

The plurality of (eight in the embodiment) fitted portions 51 are formed along the circumstantial direction of the second cover members 50. The plurality of fitted portions 51 are disposed at positions corresponding to the convex portions 43 of the first cover member 40. The fitted portion 51 is formed as a through-hole communicating the inner peripheral side and the outer peripheral side of the second cover member 50. Fitting the convex portions 43 to the fitted portions 51 joins the first cover member 40 and the second cover members 50 at the approximately center part of the through-hole 34 with the aspect of fitting the pipe portions 41 of the first cover member 40 to the inner peripheral of the second cover members 50.

Accordingly, the first cover member 40 to which the terminal of the first skin 32 is stitched and the second cover member 50 to which the terminal of the second skin 33 is stitched are joined to one another. This ensures reducing the displacement of the first skin 32 and the second skin 33 relative to the first cover member 40 and the second cover member 50. Since this ensures reducing the first skin 32 and the second skin 33 to be turned up at the outer edge of the flange portion 42 of the first cover member 40 and the end portion of the second cover member 50 on the second skin 33 side, the appearance of the vehicle seat 1 is improved.

Here, for example, in the case where hook-and-loop fasteners are disposed at the respective outer peripheral surface of the first cover member and inner peripheral surface of the second cover member to join the first cover member and the second cover member together, a position difference is likely to occur at the joined position. That is, the joined position of the first cover member and the second cover member is possibly displaced by the region (the length) that the hook-and-loop fasteners are disposed in the extension direction of the through-hole 34. Accordingly, for example, if the first cover member and the second cover member are joined together in the state where the first cover member and the second cover member are separated from one another in the front-rear direction of the seat back 3 (the state where the positions are displaced from the desired joined position), tensile force of the first skin 32 and the second skin 33 relaxes, generating the crease.

In contrast to this, according to the vehicle seat 1 of the embodiment, fitting the convex portions 43 to the fitted portions 51 joins the first cover member 40 and the second cover members 50 together. Compared with the case of joining with the hook-and-loop fasteners, this ensures reliable joining at the desired joined position, thereby ensuring reducing relaxation of the tensile force of the first skin 32 and the second skin 33. Since this ensures reducing the crease in the first skin 32 and the second skin 33, improving the appearance of the vehicle seat 1.

Since the convex portion 43 is formed projecting to the cushion member 31 side and fitted to the fitted portion 51 to the cushion member 31 side, the fitted portion 43*b* of the convex portion 43 does not project to the inner peripheral surface (the surface on the side opposite to the cushion member 31) of the first cover member 40.

Since the respective; pipe portion 41 of the first cover member 40 and second covering portion 33*b* are disposed on the inner peripheral side of the second cover member 50, the level difference of the inner peripheral surface of the second cover member 50 generated by the thickness of the first cover member 40 can be absorbed (lowered) by the thickness of the second covering portion 33*b*. Since the first cover member 40 and the second cover members 50 are joined together at the approximately center part of the through-hole 34, the seated person can be less likely to visually perceive the level difference.

Thus, reducing the projection (generation of the level difference) of the respective members from the inner peripheral surfaces of the first cover member 40, the second cover member 50, and the second covering portion 33*b* improves the appearance of the vehicle seat 1.

Here, the first cover member 40 is disposed on the seated person side; therefore, the first cover member 40 is preferably made of a resin material with high flexibility as much as possible. In this case, similar to the first cover member 40, it is also possible to form the second cover member from the resin material with high flexibility.

Note that, in the case where the second cover member is made of the resin material with high flexibility, for example, an application of an external force (a load from the seated person) in a direction (the left direction in FIG. 2) of pulling out the first cover member 40 from the through-hole 34 deforms the second cover member and the convex portion 43 is likely to exit from the through-hole. This problem can be addressed by forming the fitted portion 43*b* of the convex portion 43 larger. However, this configuration makes it difficult to insert the convex portion 43 through the fitted portion 51, deteriorating working efficiency when the vehicle seat 1 is manufactured.

In contrast to this, according to the vehicle seat 1 of the embodiment, the second cover member 50 is made of the resin material with the hardness higher than that of the first cover member 40; therefore, the deformation of the second cover member 50 due to the external force is reduced, ensuring reducing the exit of the convex portion 43 from the fitted portion 51. That is, even if the first cover member 40 is made of the resin material with high flexibility, the fitting of the fitted portion 51 to the convex portion 43 can be less likely to be disengaged. Accordingly, while the seating comfort of the vehicle seat 1 is improved, the first cover member 40 and the second cover members 50 can be strongly joined together. Since the fitted portion 43*b* of the convex portion 43 can be formed small as much as possible, the convex portion 43 can be easily fitted to the fitted portion 51. This improves the working efficiency when the vehicle seat 1 is manufactured.

Figure 3:
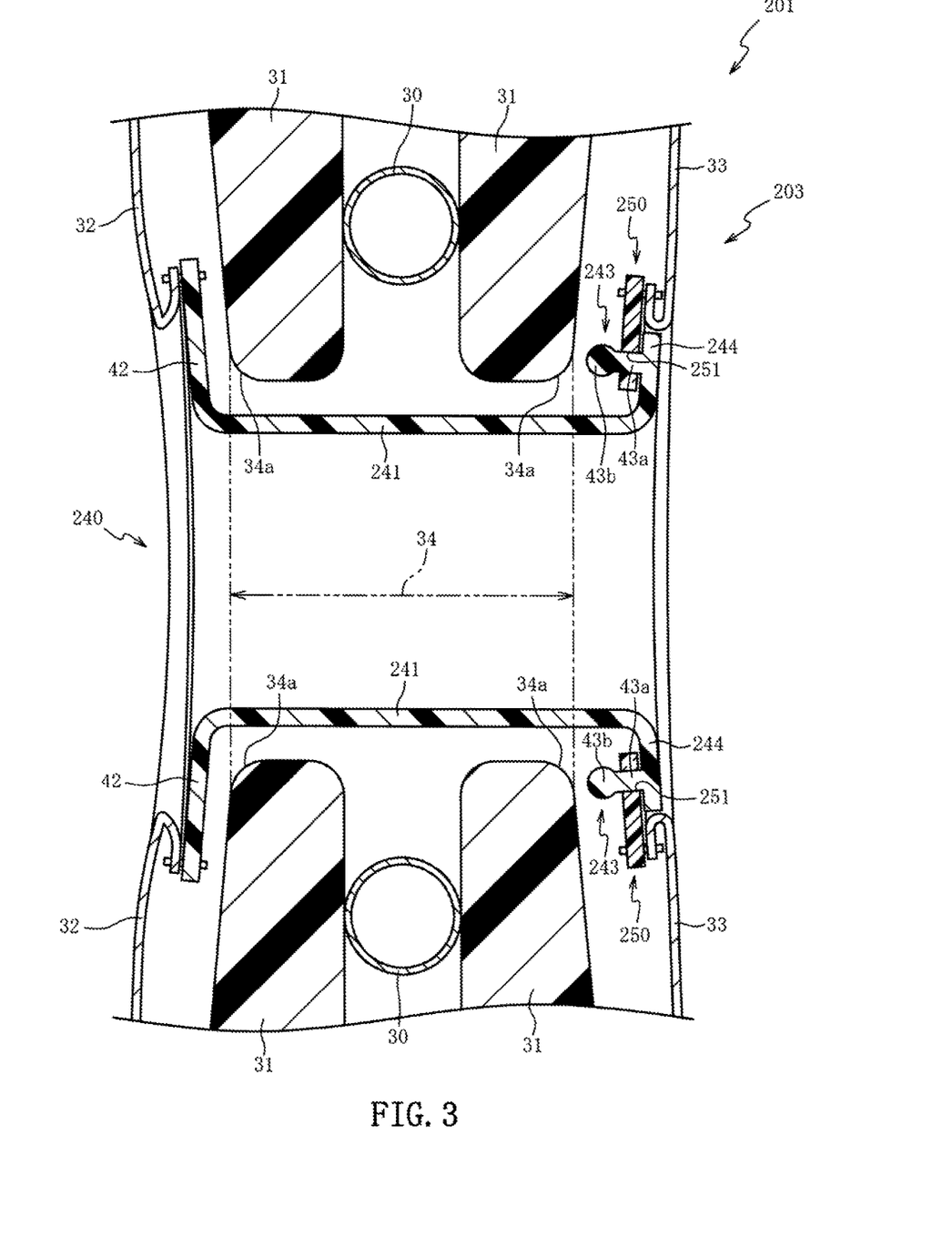
FIG. 3 is a partially enlarged cross-sectional view of a vehicle seat of a second embodiment.

The following describes a second embodiment with reference to FIG. 3. While the first embodiment describes the case where the first cover member 40 and the second cover members 50 are joined together at the approximately center part of the through-hole 34, a first cover member 240 and a second cover members 250 of the second embodiment are joined together at a rear side of a seat back 203. Like reference numerals designate corresponding or identical elements in the above-described first embodiment and the second embodiment, and therefore such elements will not be further elaborated here.

FIG. 3 is a partially enlarged cross-sectional view of a vehicle seat 201 of the second embodiment. As illustrated in FIG. 3, the first cover member 240 includes tubular pipe portions 241, which are formed along the inner peripheral surface of the through-hole 34, the flange portion 42, which is formed on the end portion of the pipe portion 241 on the first skin 32 side, a flange portion 244, which is formed on the end portion of the pipe portion 241 on the second skin 33 side, and convex portions 243, which are formed projecting from the surface of the flange portion 244 on the cushion member 31 side.

The pipe portion 241 is disposed to extend across edges 34*a* of openings on both ends of the through-holes 34. Since the flange portion 244 has the configuration identical to the flange portion 42 except that the disposed position is the end portion on the second skin 33 side and the projection length is formed shorter than the flange portion 42, the detailed description is omitted. The convex portion 243 is formed projecting to the front side (the left side in FIG. 3) of the seat back 203.

The second cover member 250 is formed as a circular flat plate and is disposed at the surface on the rear side of the cushion member 31 (adjacent to the edge 34*a* of the opening of the through-hole 34). The terminal of the second skin 33 is stitched along the outer edge of the second cover member 250. A plurality of fitted portions 251 are formed along the circumstantial direction of the second cover members 250. The plurality of convex portions 243 are formed at positions corresponding to the fitted portions 251 (along the circumstantial direction of the flange portion 244). Fitting the fitted portions 251 to the convex portions 243 joins the first cover member 240 and the second cover members 250 together.

In this case, since the edges 34a of the openings of the through-hole 34 on the respective first skin 32 side and second skin 33 side are coated by the flange portions 42 and 244 of the first cover member 240, the terminals of the first skin 32 and the second skin 33 can be positioned at the respective front side and rear side of the seat back 203. This ensures avoiding the first skin 32 and the second skin 33 to bend near the edges 34a of the openings of the through-hole 34; therefore, the crease of the first skin 32 and the second skin 33 can be reduced. This improves the appearance of the vehicle seat 201.

The second cover member 250 is disposed on the surface on the rear side of the cushion member 31, and the convex portion 243 is fitted to the fitted portion 251 to the front side of the seat back 203. Accordingly, even if the external force (the load from the seated person) is applied in the direction (the left direction in FIG. 3) of pulling out the first cover member 240 from the through-hole 34, the cushion member 31 can restrict the displacement of the second cover member 250 to the front side of the seat back 203. Since this ensures reducing the exit of the fitted portion 251 from the convex portion 243, the first cover member 240 can be made of the resin material with higher flexibility. This improves the seating comfort of the vehicle seat 201.

Figure 4:
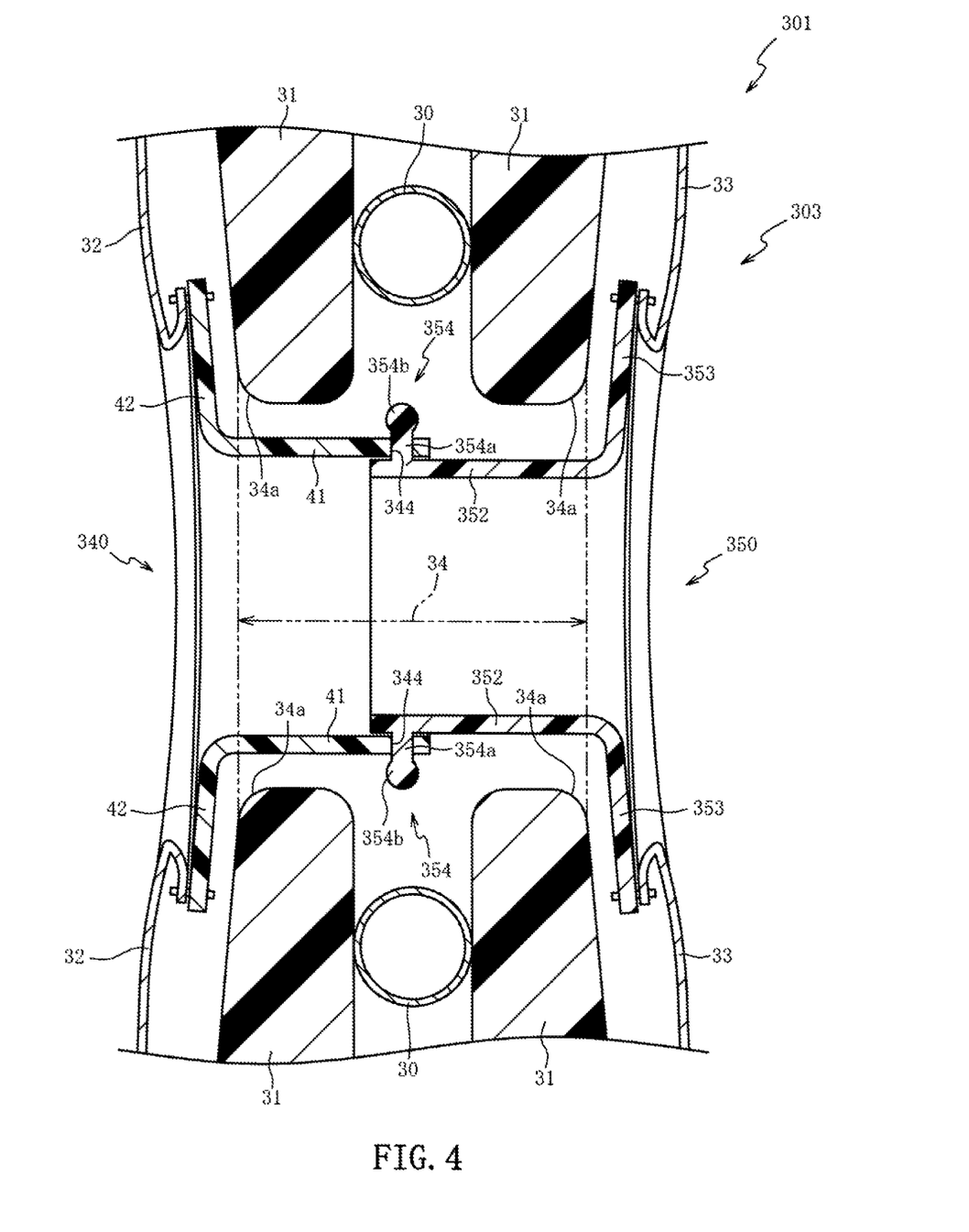
FIG. 4 is a partially enlarged cross-sectional view of a vehicle seat of a third embodiment.

The following describes a third embodiment with reference to FIG. 4. While the second embodiment describes the case where the second cover member 250 is formed into the circular flat plate, a second cover member 350 of the third embodiment includes a pipe portion 352 and a flange portion 353. Like reference numerals designate corresponding or identical elements in the above-described respective embodiments and the third embodiment, and therefore such elements will not be further elaborated here.

FIG. 4 is a partially enlarged cross-sectional view of a vehicle seat 301 of the third embodiment. As illustrated in FIG. 4, a first cover member 340 has the configuration identical to the first cover member 40 of the first embodiment except that the first cover member 340 includes a plurality of fitted portions 344 formed along the circumstantial direction of the pipe portions 41 and the convex portion 43 is not formed.

The second cover member 350 includes a tubular pipe portion 352, which is formed along the inner peripheral surface of the through-hole 34, the flange portion 353, which projects out from the end portion on the second skin 33 side of the pipe portion 352 outside in a flange shape, and a plurality of convex portions 354, which are formed projecting vertically from the outer peripheral surfaces (the surfaces on the cushion member 31 side) of the pipe portions 352 to the cushion member 31 side.

The pipe portion 352 is disposed to extend from the edge 34a of the opening of the through-hole 34 on the second skin 33 side to the proximity of the approximately center of the through-hole 34 (the center in the extension direction of the through-hole 34), and the outer periphery is formed slightly smaller than the inner periphery of the pipe portion 41.

The flange portion 353 is formed into the flange shape projecting out with a shape approximately similar to the opening of the through-hole 34 in the back view (when viewed from the right side in the right-left direction in FIG. 4) of a seat back 303. The terminal of the second skin 33 is stitched to the distal end portion of the flange portion 353 in the projecting direction. This flange portion 353 coats the edge 34a of the opening of the through-hole 34 on the second skin 33 side.

The plurality of convex portions 354 are disposed on the end portion of the pipe portions 352 on the first skin 32 side and disposed along the circumstantial direction of the pipe portions 352 positioned corresponding to the fitted portions 344. The convex portion 354 includes an upright portion 354a and a fitted portion 354b and is formed into a shape identical to the convex portion 43 of the first embodiment. Fitting the convex portions 354 to the fitted portions 344 joins the first cover member 340 and the second cover member 350 together with the pipe portions 352 of the second cover member 350 engaged with the pipe portions 41 of the first cover member 340.

In this case, the convex portions 354 are formed on the outer peripheral surface of the second cover member 350 and the fitted portions 344 of the first cover member 340 are fitted to the convex portions 354 (the pipe portions 41 are disposed on the outer peripheral sides of the pipe portions 352). Accordingly, the cushion member 31 can restrict the deformation of the pipe portion 41 in the direction that the fitted portion 344 is disengaged from the convex portion 354. Accordingly, even if the first cover member 340 is made of the resin material with high flexibility, the disengagement of fitting of the fitted portion 344 to the convex portion 354 can be reduced.

Since the convex portions 354 are formed on the second cover member 350, which is made of the resin material with the hardness higher than the first cover member 340, the deformation of the convex portion 354 itself is reduced. Accordingly, for example, in the case where the external force is applied in the direction that, the first cover member 340 and the second cover member 350 are separated from one another, the bending of the convex portion 354 due to the external force can foe reduced. This ensures further strongly joining the first cover member 340 and the second cover member 350 together; therefore, the first cover member 340 can be made of the resin material with higher flexibility. This improves the seating comfort of the vehicle seat 301.

Figure 5:
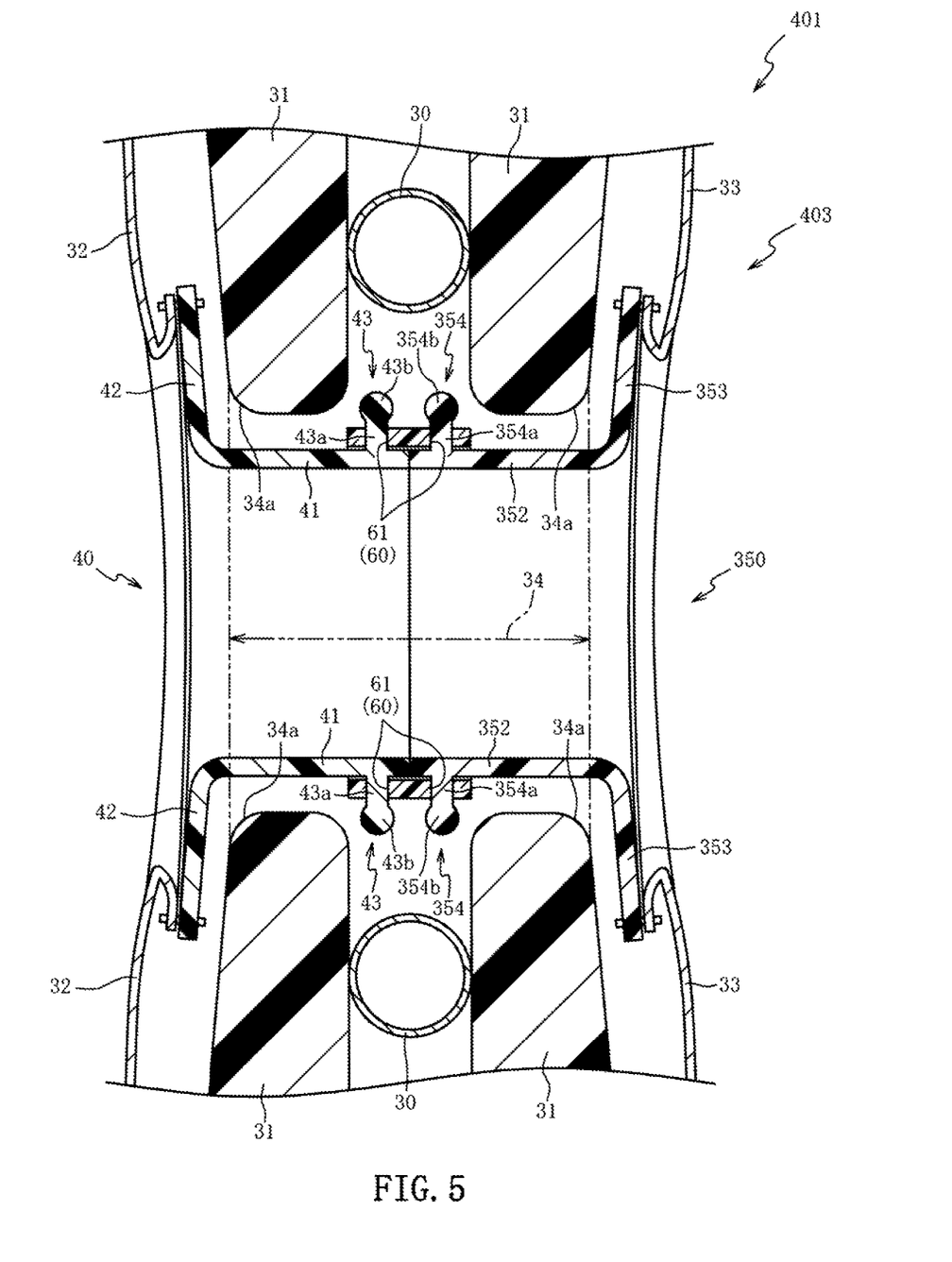
FIG. 5 is a partially enlarged cross-sectional view of a vehicle seat of a fourth embodiment.

The following describes a fourth embodiment with reference to FIG. 5. While the third embodiment describes the case where the first cover member 340 and the second cover member 350 are directly joined together to one another, the fourth embodiment joins the first cover member 40 and the second cover member 350 together via joining members 60. Like reference numerals designate corresponding or identical elements in the above-described respective embodiments and the fourth embodiment, and therefore such elements will not be further elaborated here.

FIG. 5 is a partially enlarged cross-sectional view of a vehicle seat 401 of the fourth embodiment. As illustrated in FIG. 5, the first cover member 40 and the second cover member 350 of the fourth embodiment have the configuration identical to the respective first cover member 40 of the first embodiment and second cover member 350 of the third embodiment. While the materials are different, the first, cover member 40 and the second cover member 350 are formed into the identical shape. The first cover member 40 and the second cover member 350 are joined to the joining members 60 with the aspect of butting the respective distal ends of the pipe portion 41 and the pipe portion 352 together.

The joining member 60 is made of a resin (for example, a polypropylene and an ABS resin with Rockwell R hardness of 80 to 100) harder than the first cover member 40 or a metallic material and is fixed to the frame 30 via a coupling member (not illustrated). The joining member 60 includes a plurality of fitted portions 61 formed along the circumstantial direction and formed into a tubular shape along the inner peripheral surface of the through-hole 34.

The plurality of fitted portions 61 are disposed along the circumstantial direction of the joining member 60. Defining the plurality of fitted portions 61 disposed along the circumstantial direction as one set, two sets of the fitted portions 61 are disposed at a predetermined interval in an extension direction (a front-rear direction of a seat back 403) of the joining members 60. The fitted portions 61 are disposed at positions corresponding to the convex portions 43 of the first cover member 40 and the convex portions 354 of the second cover member 350. Fitting the fitted portions 61, the convex portions 43, and the convex portions 354 joins the first cover member 40 and the second cover member 350 together via the joining members 60.

Here, as illustrated in FIG. 2, in the case where the first cover member 40 and the second cover member 50 are directly joined together to one another, the entire (the integrated) first skin 32, first cover member 40, second cover members 50, and second skin 33 are possibly displaced relative to the frame 30. In this case, for example, the application of the external force (the load from the seated person) in the direction that the first cover member 40 is pulled out from the through-hole 34, the entire first skin 32, first cover member 40, second cover members 50, and second skin 33 are displaced to the front side of the seat back 3. This relaxes the tensile force of the first skin 32, generating the crease at the first skin 32.

In the case where the first cover member 40 and the second cover members 50 are directly joined together to one another, a worker who performs the joining work needs to join the first cover member 40 and the second cover member 50 at the inside of the through-hole 34 holding both the first cover member 40 and the second cover member 50. This deteriorates the working efficiency when the vehicle seat 1 is manufactured.

In contrast to this, according to the vehicle seat 401 of the embodiment, the joining members 60 are fixed to the frame 30, and the first cover member 40 and the second cover member 350 are joined to the joining members 60. Accordingly, the joining members 60 can restrict the displacement of the first cover member 40 and the second cover member 350 relative to the frame 30.

That is, for example, compared with the case where the first cover member 40 and the second cover members 50 are directly joined together to one another, the displacement of the entire first skin 32, first cover member 40, second cover member 350, and second skin 33 relative to the frame 30 can be reduced. Accordingly, for example, even if the external force is applied in the direction that the first cover member 40 is pulled out from the through-hole 34, the relaxation of the tensile force of the first skin 32 can be reduced, thereby ensuring reducing the crease of the first skin 32. This improves the appearance of the vehicle seat 401.

Further, since both the first cover member 40 and the second cover member 350 are directly joined to the joining members 60, the respective joinings of the first cover member 40 and the second cover member 350 to the joining members 60 can be individually performed. Accordingly, for example, compared with the case where the worker holds both the first cover member 40 and the second cover member 50 and joins the first cover member 40 and the second cover member 50 to one another, working efficiency when the vehicle seat 401 is manufactured is improved.

Since the first cover member 40 and the second cover member 350 are formed into the identical shape, the first cover member 40 and the second cover member 350 can be formed from an identical mold. This ensures reducing the production cost of the vehicle seat 401.

Since the first cover member 40 and the second cover member 350 are formed into the identical shape (each include the pipe portions 41 and the pipe portions 352 with the identical shape) and joined to the joining members 60 with the aspect of butting the respective distal ends of the pipe portions 41 and the pipe portions 352 together, thereby ensuring reducing the level difference in the inner peripheral surfaces of the pipe portions 41 and the pipe portions 352. This improves the appearance of the vehicle seat 401.

Figure 6:
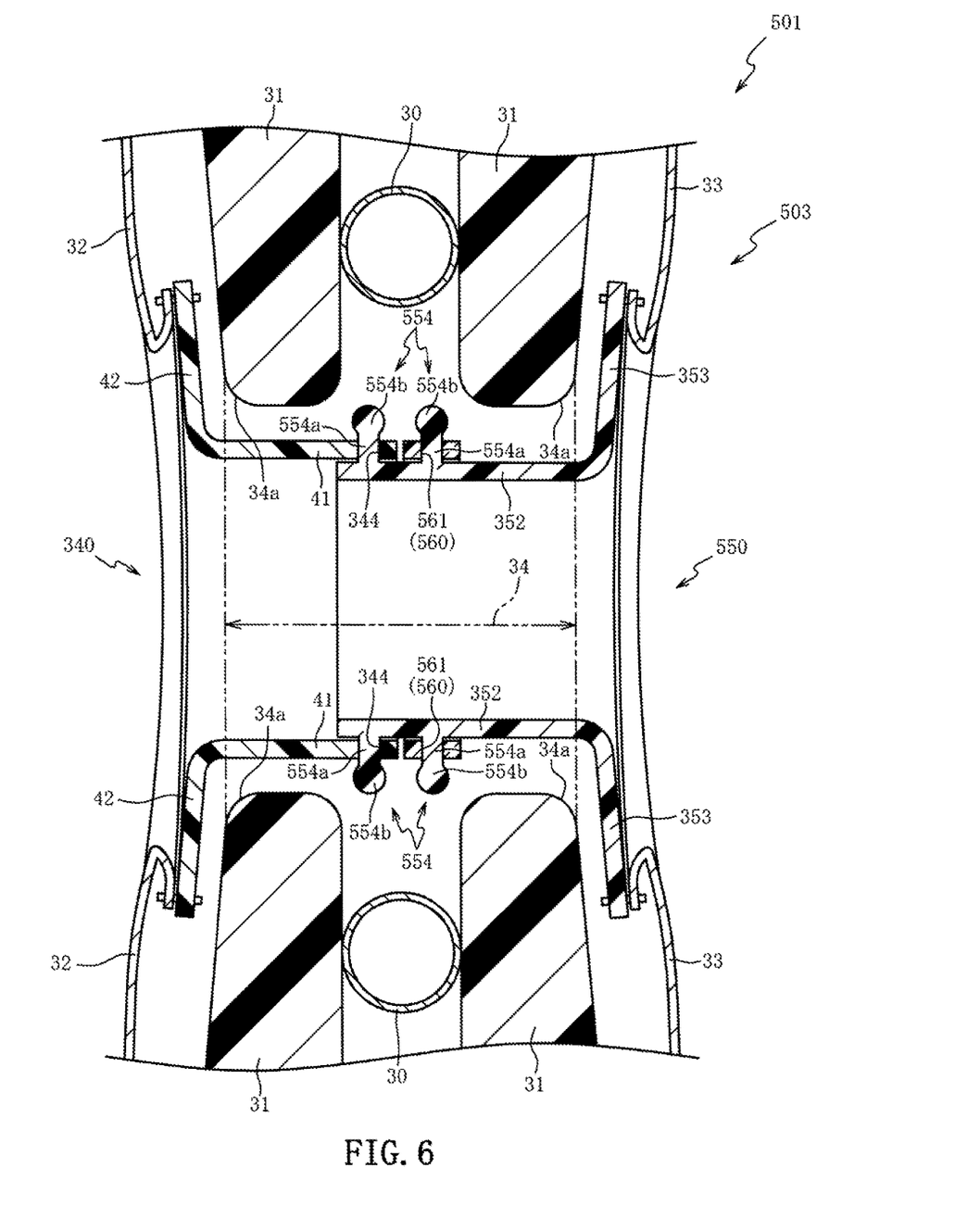
FIG. 6 is a partially enlarged cross-sectional view of a vehicle seat of a fifth embodiment.

The following describes a fifth embodiment with reference to FIG. 6. While the fourth embodiment describes the case where the respective first cover member 40 and second cover member 350 are directly coupled to the joining members 60, the first cover member 340 of the fifth embodiment is joined to joining members 560 via a second cover member 550. Like reference numerals designate corresponding or identical elements in the above-described respective embodiments and the fifth embodiment, and therefore such elements will not be further elaborated here.

FIG. 6 is a partially enlarged cross-sectional view of a vehicle seat 501 of the fifth embodiment. As illustrated in FIG. 6, the first cover member 340 of the fifth embodiment has the configuration identical to the first cover member 340 of the third embodiment. The second cover member 550 has the configuration identical to the second cover member 350 of the third embodiment except that two sets of convex portions 554 are formed at a predetermined interval in the extension direction.

The second cover member 550 includes a plurality of convex portions 554 formed projecting from an outer peripheral surface of the pipe portion 352 to the cushion member 31 side. The plurality of convex portions 554 are disposed along a circumstantial direction of the pipe portion 352. The convex portion 554 includes an upright portion 554a and a fitted portion 554b and formed into the shape identical to the convex portion 354 of the third embodiment. The joining member 560 includes a plurality of fitted portions 561 formed along the circumstantial direction.

The convex portions 554 of the second cover member 550 are formed at positions corresponding to the fitted portions 344 of the first cover member 340 and the fitted portions 561 of the joining member 560. The convex portions 554 are fitted to the respective fitted portions 344 and fitted portions 561. Accordingly, the first cover member 340 is joined to the joining members 560 via the second cover member 550 with the pipe portions 352 of the second cover member 550 engaged with the pipe portions 41 of the first cover member 340.

Accordingly, similar to the fourth embodiment, the displacement of the entire first skin 32, first cover member 340, second cover member 550, and second skin 33 relative to the frame 30 can be reduced. Since the relaxation of the tensile force of the first skin 32 and the second skin 33 can be reduced, thereby ensuring reducing the crease of the first skin 32 and the second skin 33. This improves the appearance of the vehicle seat 501.

As described above, the present invention has been described based on the above-mentioned embodiments. It can be easily inferred that the present invention will not be limited to the embodiments described above, but various modifications and improvements are possible without departing from the gist of the present invention.

A part of or all the vehicle seats of the respective embodiments may be combined with a part of or all the vehicle seat according to another embodiment to configure a vehicle seat. For example, joining members are disposed at the vehicle seats of the first embodiment to the third embodiment, and the joining members and the convex portions are coupled. Thus, the first cover member and the second cover member may be configured to be joined to the joining members.

While the respective embodiments describe the case where the through-hole 34 is formed on the seat backs 3, 203, 303, 403, and 503, the configuration is not necessarily limited to this. For example, a through-hole may be formed on the head rest 4.

While the respective embodiments describe the case where the through-hole 34 is formed into the oval shape in front view of the seat backs 3, 203, 303, 403, and 503, the configuration is not necessarily limited to this. For example, the through-hole may be formed into a circular shape and a multangular shape in front view of the seat back, and through-holes may be formed on a plurality of sites on the seat back. In this case, it is only necessary to form the first cover member and the second cover member with the shape along the spaces of the through-holes.

While the respective embodiments describe the case where the first cover members 40, 240, and 340 are made of the flexible resin material and the second cover members 50, 250, 350, and 550 are made of the resin material with the hardness higher than the first cover members 40, 240, and 340, the material is not necessarily limited to this. For example, the second cover members 50, 250, 350, and 550 may be made of the resin material identical (having flexibility) to the first cover members 40, 240, and 340. This ensures facilitating the attachment and removal of the second cover members 50, 250, 350, and 550 to the first cover members 40, 240, and 340. This ensures facilitating replacement of the first skin 32 and the second skin 33.

While the respective embodiments describe the case where the convex portions 43, 243, 354, and 554 are fitted to the fitted portions 344, 51, and 251 to join the first cover members 40, 240, and 340 and the second cover members 50, 250, 350, and 550 together, the configuration is not necessarily limited to this. For example, the first cover member and the second cover member may be joined with the hook-and-loop fastener and a hook, and may be joined by stitching, bonding, or welding. Additionally, the first cover member and the second cover member may be joined to the joining member with the hook-and-loop fastener and the hook, and may be joined by the stitching, the bonding, or the welding.

While the respective embodiments describe the case where the convex portions 43, 243, 354, and 554 are formed projecting to the cushion member 31 side, the configuration is not necessarily limited to this. For example, the convex portions may be formed projecting to the side opposite to the cushion member 31.

While the respective embodiments describe the case where the plurality of convex portions 43, 354, and 554 are disposed along the circumstantial direction of the pipe portions 41 and the pipe portions 352 and the plurality of convex portions 243 are disposed along the circumstantial direction of the flange portion 244, the configuration is not necessarily limited to this. For example, the convex portions may be disposed in a stagger pattern along the circumstantial direction of the pipe portions 41, the pipe portions 352, and the flange portion 244.

While the respective embodiments describe the case where the fitted portions 344, 51, and 251 are formed as the through-holes, the configuration is not necessarily limited to this. For example, the fitted portions may be formed as depressed portions, and a part of the depressed portions may be continuously formed to form a groove shape. In this case, it is only necessary to form the convex portions with a shape fittable to the depressed portions and the groove.

The first embodiment describes the case where three pieces of the convex portions 43 are disposed on the respective outer peripheral surfaces on both sides in the upper-lower direction of the pipe portions 41 and one piece of the convex portion 43 is disposed on the respective outer peripheral surfaces on both sides in the right-left direction of the pipe portions 41 and these eight pieces of the convex portions 43 are disposed along the circumstantial direction of the pipe portions 41; however, the configuration is not necessarily limited to this. For example, it is preferable to set the count of the convex portions on the outer peripheral surface on the lower side larger than the count of the convex portions on the outer peripheral surface on the upper side in the upper-lower direction of the pipe portion 41.

That is, when the load from the seated person is applied to the first skin 32, the force is likely to be applied such that the site on the lower side of the first cover member 40 (the pipe portion 41) is likely to be pulled out from the through-hole 34. In contrast to this, setting the count of the convex portions on the outer peripheral surface on the lower side larger than the count of the convex portions on the outer peripheral surface on the upper side in the upper-lower direction of the pipe portion 41 allows reducing the disengagement of the joining between the first cover member 40 and the second cover member 50 due to the load from the seated person. Accordingly, the first cover member 40 can be made of the resin material with higher flexibility.

The convex portions disposed on the outer peripheral surface on the lower side in the upper-lower direction of the pipe portions 41 are preferably disposed at the positions (the front side of the seat back 3) close to the edges 34a of the openings of the through-hole 34 with respect to the convex portions disposed on the outer peripheral surface on the upper side. That is, as described above, when the load from the seated person is applied to the first skin 32, the force is likely to be applied such that the site on the lower side of the first cover member 40 (the pipe portion 41) is pulled out from the through-hole 34.

In this case, by disposing the convex portions disposed on the lower side of the pipe portions 41 on the side where the flange portion 42 is formed and the rigidity is relatively high, the deformation of the pipe portion 41 so as to narrow can be reduced. This allows reducing the disengagement of the joining between the first cover member 40 and the second cover member 50 due to the load from the seated person, the first cover member 40 can be made of the resin material with higher flexibility.

The convex portions disposed on the outer peripheral surfaces on both sides of the pipe portions 41 in the right-left direction are preferably disposed at positions close to the edges 34a of the opening of the through-hole 34 with respect to the convex portions disposed on the outer peripheral surfaces on both sides of the pipe portions 41 in the upper-lower direction. Accordingly, even when the through-hole 34 (the first cover member 40 and the second cover member 50) are formed into the oval shape, the work to fit the convex portions disposed on both sides of the pipe portions 41 in the right-left direction to the fitted portions 51 can be easily performed.

The third embodiment describes the case where the pipe portion 352 of the second cover member 350 is engaged with the pipe portion 41 of the first cover member 340; however, the configuration is not necessarily limited to this. For example, the convex portion 43 is formed at the outer peripheral surface of the pipe portion 41 of the first cover member 340 and the fitted portion (the through-hole) is formed on the second cover member 350. Thus, the configuration that the pipe portion 41 of the first cover member 340 is engaged with the pipe portion 352 of the second cover member 350 may be employed. Accordingly, even if the level difference occurs in the inner peripheral surfaces of the pipe portion 41 and the pipe portion 352, the level difference can be less likely to be visually perceived from the seated person side (the front side of the seat back 303). This improves of appearance of the vehicle seat 301.

While the fourth embodiment describes the case where the first cover member 40 and the second cover member 350 are formed of the identical shape, the configuration is not necessarily limited to this. For example, the first cover member and the second cover member may be formed into the identical shape from an identical material. Since this reduces the number of components, the product cost of the vehicle seat can be reduced.

The fourth embodiment describes the case where the first cover member 40 and the second cover member 350 are joined via the joining members 60. That is, while the fourth embodiment describes the case where the first cover member 40 and the second cover member 350 are not directly joined to one another, "the first cover member and the second cover member are joined together" described in claim 1 is defined including a configuration where the first cover member and the second cover member are joined via the joining member.

While the fifth embodiment describes the case where the first cover member 340 is joined to the joining members 560 via the second cover member 550 with the pipe portions 352 of the second cover member 550 engaged with the pipe portions 41 of the first cover member 340, the configuration is not necessarily limited to this. For example, by forming the convex portion 43 on the outer peripheral surface of the pipe portion 41 of the first cover member 340 and forming the fitted portion (the through-hole) on the second cover member 550, the pipe portion 41 of the first cover member 340 may foe engaged with the pipe portion 352 of the second cover member 550. Accordingly, even if a level difference occurs at the inner peripheral surfaces of the pipe portion 41 and the pipe portion 352, since the level difference is less likely to be visually perceived from the seated person side (the front side of the seat back 303), the appearance of the vehicle seat 301 is improved.

In this case, the fitted portion (the through-hole) formed on the second cover member 550 may be configured to be disposed on the rear side of the seat back 503 with respect to the convex portion 554. In this case, it is only necessary to form an extension length of the pipe portion 41 of the first cover member 340 long.

The invention claimed is:

1. A vehicle seat comprising a seat back, wherein the seat back includes:
    a cushion member where a through-hole is formed to pass through along a front-rear direction;
    a first skin that coats a surface on a front side of the cushion member;
    a second skin that coats a surface on a rear side of the cushion member; and
    a cover member that coats at least a part of an inner peripheral surface of the through-hole, the cover member being made of a resin material, wherein:
    the cover member is constituted of a first cover member and a second cover member, the first skin having a terminal stitched to the first cover member, the second skin having a terminal stitched to the second cover member, and
    the first cover member and the second cover member are joined together.

2. The vehicle seat according to claim 1, wherein:
    any one of the first cover member or the second cover member has a through-hole or a fitted portion formed as a depressed portion, the other one having a convex portion formed fittable to the fitted portion, and
    the fitted portion and the convex portion are fitted to join the first cover member and the second cover member together.

3. The vehicle seat according to claim 2, wherein:
    the fitted portion is formed as a through-hole, and
    the convex portion is formed projecting to the cushion member side, the convex portion being fitted to the fitted portion to the cushion member side.

4. The vehicle seat according to claim 3, wherein:
    the first cover member includes a tubular pipe portion and a flange portion, the pipe portion being formed along the inner peripheral surface of the through-hole, the flange portion projecting out from an end portion of the pipe portion on the first skin side to outside in a flange shape, the flange portion coating an edge of an opening of the through-hole, the first cover member being made of a resin material with predetermined flexibility, and
    the second cover member is made of a resin material with a hardness higher than the first cover member.

5. The vehicle according to claim 4, wherein
    the convex portion is formed at the second cover member.

6. The vehicle seat according to claim 2, wherein
    any one of the first cover member or the second cover member includes a plurality of the fitted portions, the other one including a plurality of the convex portions.

7. The vehicle seat according to claim 1, wherein:
    the seat back includes a frame and a joining member, the frame forming a framework of the seat back, the joining member being fixed to the frame and formed along the inner peripheral surface of the through-hole, and
    any one of the first cover member or the second cover member is joined directly to the joining member, the other one being joined to the joining member via any one of the first cover member or the second cover member or joined directly to the joining member.

8. The vehicle seat according to claim 7, wherein
    the first cover member and the second cover member are both joined directly to the joining member.

9. The vehicle seat according to claim 8, wherein
    the first cover member and the second cover member are formed into an identical shape.

10. The vehicle seat according to claim 1, wherein:
    the second cover member is disposed inside the through-hole,
    the second skin includes a first covering portion and a second covering portion, the first covering portion coating the surface on the rear side of the cushion member, the second covering portion being stitched to the first covering portion, the second covering portion coating the inner peripheral surface of the through-hole, and the first covering portion and the second covering portion have a stitched position at a position along an edge of an opening of the through-hole.

11. The vehicle seat according to claim 1, wherein the through-hole has an opening whose edge is coated by the first cover member and the second cover member.

12. The vehicle seat according to claim 1, wherein the first cover member is joined to an inner peripheral side of the second cover member.

13. The vehicle seat according to claim 12, wherein the second skin is coupled to the inner peripheral side of the second cover member.

* * * * *